(12) United States Patent
Chan et al.

(10) Patent No.: US 7,808,960 B1
(45) Date of Patent: Oct. 5, 2010

(54) WIRELESS INFRASTRUCTURE AND AD HOC NETWORK INTEGRATION

(75) Inventors: Shueng Han Gary Chan, Hong Kong (CN); Jiancong Chen, Hong Kong (CN); Chi Fai Wong, Hong Kong (CN); Shenjie Li, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 628 days.

(21) Appl. No.: 11/753,864

(22) Filed: May 25, 2007

Related U.S. Application Data

(60) Provisional application No. 60/802,996, filed on May 25, 2006.

(51) Int. Cl.
*H04W 4/00* (2009.01)
(52) U.S. Cl. .................. 370/338; 370/328; 370/310; 455/507
(58) Field of Classification Search .................. 370/310, 370/328, 338, 254–255, 315; 455/423, 500, 455/503, 507; 709/223
See application file for complete search history.

(56) References Cited

U.S. PATENT DOCUMENTS

| | | | |
|---|---|---|---|
| 6,304,556 B1 * | 10/2001 | Haas | ........................... 370/254 |
| 6,580,981 B1 | 6/2003 | Masood et al. | |
| 6,879,574 B2 | 4/2005 | Naghian et al. | |
| 2003/0033394 A1 * | 2/2003 | Stine | ........................... 709/222 |
| 2003/0139197 A1 * | 7/2003 | Kostic et al. | ................. 455/525 |
| 2007/0204021 A1 * | 8/2007 | Ekl et al. | ..................... 709/223 |

OTHER PUBLICATIONS

IEEE Standard Board, "Wireless LAN Medium Access Control (MAC) and Physical Layer (PHY) Specifications," IEEE Std 802.11, Jun. 25, 2008, 130 pages.
Jiancong Chen et al., "Mixed-Mode WLAN: The Integration of Ad Hoc Mode with Wireless LAN Infrastructure," in proceeding for IEEE Globecom, pp. 231-235, Dec. 2003.
Jiancong Chen et al., "A Framework to Relieve Wireless Hot-Spot Congestion by Means of Ad Hoc Connections," in Proceeding os IEEE International Conference on Mobile and Wireless Communications Networks (MWCN). Singapore: IEEE, Oct. 2003, 4 pages.
William D. List et al., "A Routing Protocol for k-hop Networks," IEEE Communications Society, WCNC 2004, pp. from 2545-2550.
Seungjoon Lee et al, "The Case for a Multi-hop Wireless Local Area Network," in infocom 2004, Hong Kong:IEEE Mar. 2004, 12 pages.

(Continued)

*Primary Examiner*—Kamran Afshar
(74) *Attorney, Agent, or Firm*—Schwabe, Williamson & Wyatt, P.C.

(57) ABSTRACT

A system and method for integrating infrastructure and ad hoc wireless networks. In one example embodiment, a plurality of nodes and access points exchange beacons and route replies which are forwarded by intervening nodes. Nodes determine whether to switch access points based on cost values contained in the received beacons. Intervening nodes store routes with weights to the source node, such that the access points maintain weights to every node in their zones.

46 Claims, 14 Drawing Sheets

The flowchart of beacon process in a node

OTHER PUBLICATIONS

Elizabeth M. Royer et al., "A Review of Current Routing Protocols for Ad Hoc Mobile Wireless Networks," IEEE Personal Communications, Apr. 1999, pp. 46-55.

Charles E. Perkins et al., "Highly Dynamic Destination-Sequenced Distance-Vector Routing (DSDV) for Mobile Computers," in ACM SIGCOMM'94, London, UK, 1994, pp. 234-244.

Charles E. Perkins et al., "Ad-hoc On-Demand Distance Vector Routing," in the 2nd IEEE Workshop on Mobile Computing Systems and Applications, New Orleans, LA, Feb. 1999, 11 pages.

D. Johnson et al., "DSR: The Dynamic Source Routing Protocol for Multihop Wireless Ad Hoc Networks," Addison-Wesley, 2001, Ch.5, pp. from 139-172.

Richard Draves et al., "Comparison of Routing Metrics for Static Multi-Hop Wireless Networks," in ACM SIGCOMM, Portland, OR: ACM, Aug. 2004, pp. 133-144.

Hongyi Wu et al., "Integrated Cellular and Ad Hoc Relaying Systems: iCAR," IEE Journal on Selected Areas in Communications, vol. 19, No. 10, Oct. 2001, pp. 2105-2115.

Evsen Yanmaz et al., "Efficient Dynamic Load Balancing Algorithms using iCAR Systems: A Generalized Framework," in Proceeding of Vehicular Technology Conference, VTC2002, IEEE, Fall 2002, pp. 586-596.

Eric Hsiao-Kuang Wu et al., "Dynamic Adaptive Routing for a Heterogeneous Wireless Network," in Proceeding of Global Telecommunications Conference 2001, pp. 3608-3612.

Ying-Dar Lin et al., "Multihop Wireless IEEE 802.11 LANs: A Prototype Implementation," in proceeding of IEEE International Conference on Communications, 1999, IEEE 1999, pp. 1568-1572.

Lin Du et al., "A Bubble Oscillation Algorithm for Distributed Geographic Load Balancing in Mobile Networks," in Infocom 2004, Hong Kong: IEEE, Mar. 2004, pp. 330-338.

Yashar Ganjali et al., "Load Balancing in Ad Hoc Networks: Single-path Routing vs. Multi-path Routing," in Infocom 2004, Hong Kong: IEEE, Mar. 2004, pp. 1120-1125.

Shih-Chang Huang et al., "Energy-Aware, Load Balanced Routing Schemes for Sensor Networks," International Conference on Parallel and Distributed Systems, IEEE, Jul. 2004, 7 pages.

Vikas Kawadia et al., "System Services for Implementing Ad-Hoc Routing Protocols," in Proceedings of International Conference on Parallel Processing Workshops, 2002 IEEE, 8 pages.

Webpage of Linux Wireless—Information about Wireless Networking, retrieved Feb. 3, 2010 from http://linuxwireless.org/, 3 pages.

Wavelan et al, "Wireless Tools for Linux," Aug. 29, 2008, retrieved Feb. 3, 2010 from http://www.hpl.hp.com/personal/Jean_Tourrilhes/Linux/Tools.html, 14 pages.

Kilian Weniger et al., "Address Autoconfiguration in Mobile Ad Hoc Networks: Current Approaches and Future Directions," IEEE Network Magazine, vol. 18, No. 4, Jul./Aug. 2004, pp. 6-11.

AODV-UU, "Ad-hoc On-demand Distance Vector Routing," Aug. 20, 2008, retrieved Apr. 15, 2010 from http://core.it.uu.se/core/index.php/AODV-UU, 3 pages.

"AODV (Ad Hoc on Demand Distance Ventor)," retrieved Apr. 15, 2010, from http://moment.cs.ucsb.edu/AODV/aodv.html, 3 pages.

"Kernal AODV," Wireless Communication Technologies Group, National Institute of Standards and Technology, Nov. 5, 2001, retrieved Feb. 3, 2010, from http://w3.antd.nist.gov/wctg/aodv_kernel/, 1 page.

The netfilter webmaster, "What is netfilter.org," 1999-2008, retrieved Feb. 3, 2010, from http://www.netfilter.org/, 1 pages.

IEEE Standard Board, "Part 11: Wireless LAN Medium Access Control (MAC) and Physical Layer (PHY) Specifications," ANSI/IEEE Std 802.11, 1999 Edition, 530 pages.

\* cited by examiner

A unified multi-hop WLAN architecture

The flowchart of beacon process in a node

Obtaining an IP address for a mobile node in WIANI

```
Struct Message{
    // If it is a BEACON message, msgType = '1'
    // If it is a BREP message, msgType = '2'
    char msgType;

// The ID of an AP (IP address)
    char apId[4]; // (==apAddr)

// The sequence number of this beacon message
    short seq;

// TTL (Time-To-Live) indicates how many hops
    // that this message is to be forwarded
    // Remark: It is as a 8-bit integer
    // If it is a BREP message,
    // '1' indicates association and '2' indicates dissociation
    char ttl;

// Records how many hops that this message has traveled
    // Remark: It is as a 8-bit integer
    char hop;

// The cost of joining this AP
    // If it is a BREP message, it stores the cost to the node
    float cost;

// Available IP address 0
    // If it is a BREP message, it stores the address of the sender
    char addr0[4];

// Available IP address 1,2,3 and 4
    char addr1[4];
    char addr2[4];
    char addr3[4];
    char addr4[4];
```

| msgType | apId | seq | ttl | hop | cost | addr0 | addr1 | addr2 | addr3 | addr4 |
|---------|------|-----|-----|-----|------|-------|-------|-------|-------|-------|
| 8 | 32 | 16 | 8 | 8 | 16 | 32 | 32 | 32 | 32 | 32 |

Number of bits:

The BEACON message structure

*FIG. 5*

```
void ApOperation::handleMessage( struct Message * ic_pkt, string fromAddr ){
    // It is a Beacon message forwarded/sent by fromAddr
    if ( rc_pkt->msgType == '1'){
        // No Processing
    }
    // It is a BREP message forwarded/sent by fromAddr
    else if ( rc_pkt->msgType == '2'){
        // Process the BREP only if apId == this Ap's ID
        if ( isEqual(rc_pkt->apId, My Id) ){
            // It is an association request from rc_pkt->addr0
            if ( rc_pkt->ttl == Association){
                // Add/Update the node list
                nodeList.add( rc_pkt-.addr0,fromAddr, rc_pkt->cost );
                // Update the AP current cost
                currentCost = calculateCost0;
            }
            // It is a dissociation request from rc_pkt->addr0
            else{
                // Remove rc_pkt->addr0 from the node list
                nodeList.erase( rc_pkt->addr0 );
                // Update the AP current cost
                currentCost = computeCost0;
            }
        }
    }
}
```

AP code Fragment to maintain network topology

*FIG. 6*

```
void NodeOperation::handleMessage( struct Message * rc_pkt, string fromAddr ){
  // It is a Beacon message forwarded/sent by fromAddr
  if ( rc_pkt->msgType == '1'){
    map ,string, ApListEntry*>::iterator itr = apList.find (toString(rc_pkt->apId));
    // It is a new AP or an AP from other zone
    if(itr ==apList.end0 II (ltr !=apList.end0 && !isEqual(rc_pkt->apId,DefaultAP))){
      // It is a new AP
      if (itr == apList.end0){
        // Add to apList
        ApListEntry* ptr = new ApListEntry (rc_pkt->apId,rc_pkt->seq,rc_pkt->hop, fromAddr,rc-pkt->cost
        apList.insert( map< string, ApListEntry* >::value_type(toString9rc_pkt->apId), ptr));
      }
      // If the cost is lower than the current cost by a given threshold
      if ((apList.lowestCost0 --rc_pkt->)cost) > threshold){
        //Flip a coin to determine whether to switch
        if ((rand0 % 2) ==0){
          // Send a dissociation request
          send BREP (get DefaultAp0, apList,.getAddr(defaultAp), false);
          // Send a association request
          send BREP (rc_pkt->apId, fromAddr, true);
          //Update default AP
          setDefaultAp (rc_pkt->apId, fromAddr)
          // Forward the BEACON message
          fwdBeacon (rc_pkt);
```

Code fragment a a node to handle beacon message

*FIG. 7A*

```
        }
      }
    }
  }
  // It is a zone AP
  else{
    // If it is a new BEACON
    if (checkSeq(rc_pkt->seq)){
      // Update the AP cost
      apList.updateCost (rc_pkt->apId, rc_pkt->cost);
      // Send a BREP message
      send BREP (getDefaultAP0), apList, getAddr(defaultAP), true);
      // Forward the BEACON message
      fwdBeacon (rc_pkt);
    }
  }
}
// It is a BREP message forwaded/sent by from Addr
else if (rc_pkt->msgType == '2'){
  //Forward the BREP message
  fwdBREP (rc_pkt->apLd, rc_pkt);
}
}
```

Code fragment at a node to handle beacon message
*FIG. 7B*

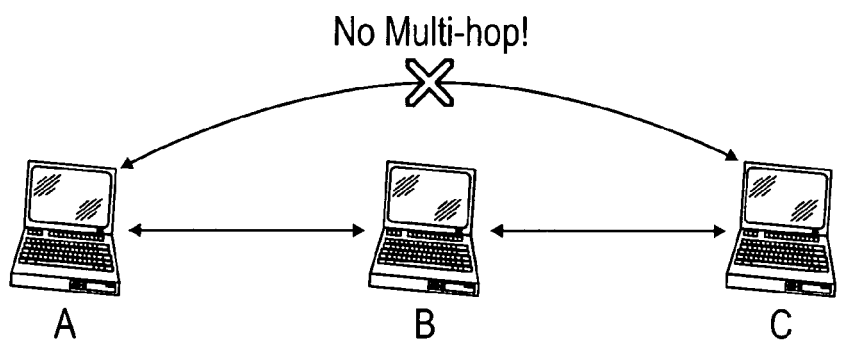

IEEE ad-hoc mode: A cannot talk to C through B
*FIG. 8*

Weighted ∞-hop routing protocol messaging.

WIANI routing architecture

The number of nodes served comparing to a single-hop WLAN

Performance comparison among LBR, KRP and AODV (A) TCP flows (B) UDP flows

Network throughout comparison

Experimental setup on the 2nd floor of the postgraduate HsII II at the HKUST

Comparison of the local communication throughput between traditional WLAN and WIANI Comparison of the Internet throughput between traditional WLAN and WIANI

WIRELESS INFRASTRUCTURE AND AD HOC NETWORK INTEGRATION

CROSS-REFERENCE TO RELATED APPLICATIONS

This application claims priority from U.S. provisional patent application 60/802,996 filed on May 25, 2006, which is hereby incorporated by reference.

BACKGROUND AND SUMMARY OF THE INVENTION

The present application relates to wireless networks, and more particularly to integration of integration of infrastructure and ad hoc networks.

DESCRIPTION OF BACKGROUND ART

Infrastructure-based IEEE 802.11 wireless networks, the so-called wireless LAN (WLAN), has been widely deployed for broadband access. In traditional WLAN, all users directly connect to an access point (AP) for communication. This leads to limited coverage, low load-balancing capability and hence throughput.

The penetration of IEEE 802.11-based wireless networks (the so-called "WiFi") into our homes, offices, and cafes has provided users ubiquitous broadband Internet access. These wireless networks make use of "infrastructure" mode, where an access point (AP) offers wireless users in its coverage access to the Internet. Although the 802.11 networks offer high data rate, the transmission range is limited by the one-hop connections in the infrastructure networks (usually less than 100 m indoor or 250 m outdoor). Employing ad hoc mode in 802.11 in both APs and mobile nodes can extend traditional wireless local area networks (WLAN) to multiple hops, thus increasing the coverage and reducing the needs of additional infrastructures. Such architecture is called. WIANI (Wireless Infrastructure and Ad-hoc Network Integration).

Different from traditional WLAN, nodes in WIANI may connect to an AP through multiple hops or communicate to each other without going through an AP. FIG. 1 shows the WIANI architecture. The APs are connected by a wired network (such as an Ethernet). The traffic among APs always goes through the wired network. In wireless channel, the APs and nodes communicate using ad hoc mode. WIANI differs from the mobile ad hoc networks, in which there are no APs providing services to the nodes.

There are a number of benefits of the WIANI architecture:

Extended wireless coverage and reduced deployment cost: In the traditional WLAN, a node must be located within the coverage area of some AP to receive wireless services. WIANI extends the coverage area by ad hoc connections. Such a solution is particularly useful in handling temporary needs. If a transient user population moves into an area with no AP coverage, WIANI can be used to provide immediate wireless services. Obviously deploying more APs to cover the popular area may be a long-term solution. However, covering a large area by single-hop WLAN may require a lot of APs, among which some may not be useful most of the time. Therefore, multi-hop solution is more appropriate to handle transience. By deploying WIANI, fewer APs are required to provide wireless services in the same area. Hence the deployment cost can be reduced.

Performance enhancement: First, with ad hoc support, a node has more opportunities for path selection to route its data through the network. It may use a path through an AP or just use ad hoc nodes to forward its data if the AP is congested. Second, a mobile node with low battery power may choose closer neighbor to forward packets to an AP rather than send directly through a long distance. Hence the node significantly reduces the energy requirements for communication. Meanwhile, communicating with closer nodes also increases the received signal quality and hence allows the 802.11 protocol to operate at the higher data rate. 999

Load-balancing among APs: In traditional WLAN, the uneven distribution of users may leads to congestion of some APs. While in WIANI, since a node can connect to an AP in a multi-hop way, the traffic load can be better balanced.

To realize such a multi-hop WLAN, there are a number of challenges and issues, such as channel access and assignment, routing and fairness issues, etc. One of the most important issues to be considered is the routing protocol for the network since the connections to an AP are extended to multiple hops and the local ad hoc routing is enabled. Plenty of routing protocols have been proposed for mobile ad hoc networks, such as DSDV, AODV, DSR and so on. However, these protocols do not take into consideration the advantages of using the APs in the network. Therefore, the present application proposes a dynamic load-balancing routing protocol for WIANI.

Wireless Infrastructure and Ad Hoc Network integration

A system and method for integrating infrastructure and ad hoc wireless networks. In one example embodiment, a plurality of nodes and access points exchange beacons and route replies which are forwarded by intervening nodes. Nodes determine whether to switch access points based on cost values contained in the received beacons. Intervening nodes store routes with weights to the source node, such that the access points maintain weights to every node in their zones. Further examples and embodiments are described more fully below.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 5 shows a beacon message structure consistent with an example of the present innovations.

FIG. 6 shows a code fragment to maintain network topology consistent with an example of the present innovations.

FIG. 7 shows a code fragment at a node to handle beacon messages consistent with an example of the present innovations.

FIG. 8 shows an example IEEE ad hoc mode.

DETAILED DESCRIPTION OF THE PREFERRED EMBODIMENTS

Figure 1:
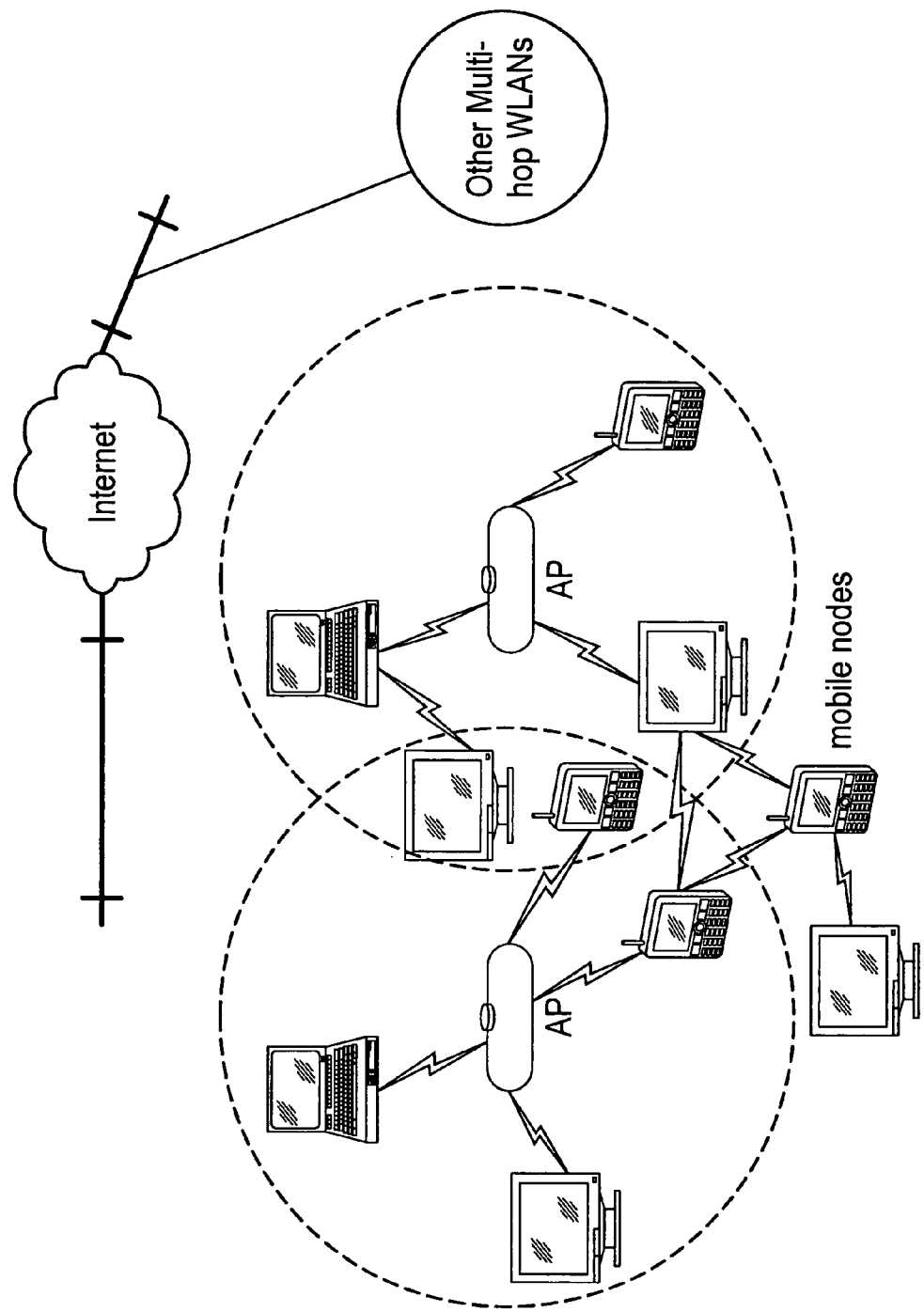
FIG. 1 shows a unified multi-hop WLAN architecture, consistent with an example of the present innovations.

The numerous innovative teachings of the present application will be described with particular reference to the presently preferred embodiment (by way of example, and not of limitation).

To achieve high availability and high throughput for multimedia access, the present innovations include seamlessly integrating wired infrastructure with the "ad-hoc" mode as defined in IEEE 802.11 standard. The project, termed Wireless Infrastructure and Ad-hoc Network Integration (WIANI), allows mobile users connect to APs through multiple hops and autonomously form local, groups for communication. The present innovations preferably include the zone concept and routing in WIANI, and its system and software architecture. The present application also provides implementation details of WIANI in Linux.

In one example embodiment, the present innovations include two parts: the load-balancing zone forming and weighted x-hop routing algorithms. A zone for an AP is defined by the nodes that have default route to it. In our zone forming algorithm, the APs broadcast beacons periodically to let the nodes join the zones. In the weighted x-hop routing, a dynamic weight is assigned to each node and AP according to its traffic condition. A path with the lowest weight is selected as the best route. The number x limits the traveling hops of a route request (RREQ) and hence reduces the communication overhead.

In preferred embodiments, the present innovations include a new WIANI architecture. The present innovations result in a load-balancing scheme that achieves better system performance comparing to AODV and k-hop routing protocol.

Prior work on LANs and ad-hoc networks treats the two types of networks separately without considering a unified architecture. Wu et al. propose a system named iCAR which integrates cellular system with ad hoc relays. Such integration is also studied in another protocol called Heterogeneous Wireless Network. In them, the cellular system uses a frequency band different from that of the ad hoc networks. It requires two radios in each device, leading to a more expensive solution.

The present innovations differ, in one example embodiment, in the use of a unified wireless system in which the bandwidth may be shared by all users, and hence the performance improvement with ad hoc relay is not obvious. Lin et al. propose a bridging protocol to enable multi-hop connections from a node to an AP. The case for a Multi-hop WLAN is also presented in the prior art, which modifies the MAC layer to enable multi-hop wireless path establishment. However, the present innovations include a mixed-mode WLAN framework to enhance the performance of WLAN and address the hot-spot congestion problem. This work differs by considering a more general system which involves both ad hoc routing and routing to zone APs in network layer.

List et al. propose a routing protocol similar to AODV for k-hop networks, in which wireless hops in ad hoc connections are upper bounded by k. The present innovations, in preferred embodiments, differ in at least the following ways:

1) A zone forming protocol is used to maintain topology information.

2) Dynamic weights are assigned to nodes according to traffic conditions in the nodes for making routing decision.

3) Although TTL is preferably used to limit the traveling hops of route requests, the number may be different among nodes while the k-hop networks predefine the same limit for all nodes.

Load-balancing routing protocols have been studied in different networks including wired (ATM and optical) and wireless (hot-spot, ad hoc and sensor) networks. However, the previous schemes focus on different systems with different characteristics. Hence it is not straight forward to apply them in other environments.

The present innovations, in one example embodiment, describe the detailed protocol of load-balancing zone forming. A zone is defined as the set of nodes virtually associated to the same AP through one hop or multiple hops. Here, the association to a AP means the node maintains a default route to the AP. The APs send beacons periodically to gather and maintain the zone information. On receiving a beacon, a node makes decisions on which zone (AP) to join and then responds. In the following, the unified multi-hop wireless LAN architecture is first described, and then the detailed load-balancing zone forming algorithm is discussed.

The Architecture of WIANI

In WIANI, there are a number of APs and nodes as shown in FIG. 1. The APs are connected to the wired network (such as the Internet). In the wireless channel, all the APs and nodes use a unified ad hoc mode to communicate with each other.

Consistent with embodiments of the present innovations, the APs provide Internet services and inter-network connectivities to the mobile users. The local communications among nodes may be routed either along the ad hoc nodes or through the APs. Therefore, the APs should know which nodes they need to serve and each node needed to maintain a route to an AP. Such routes may change dynamically as nodes move around. To accomplish such a purpose, preferred embodiments of the present innovations deploy an AP-driven beaconing mechanism to form a zone for each AP. A joining cost is assigned to the beacon message. A node receiving a beacon makes joining decision based on the cost and sets default route to the AP with the lowest cost by sending a reply. The AP discovers the nodes of its zone from such replies.

Load-Balancing Zone Forming

To balance the traffic load among the APs, the present application proposes a load-balancing zone forming protocol based on AP-driven beaconing. The beaconing process works as follows.

Figures 2, 3:
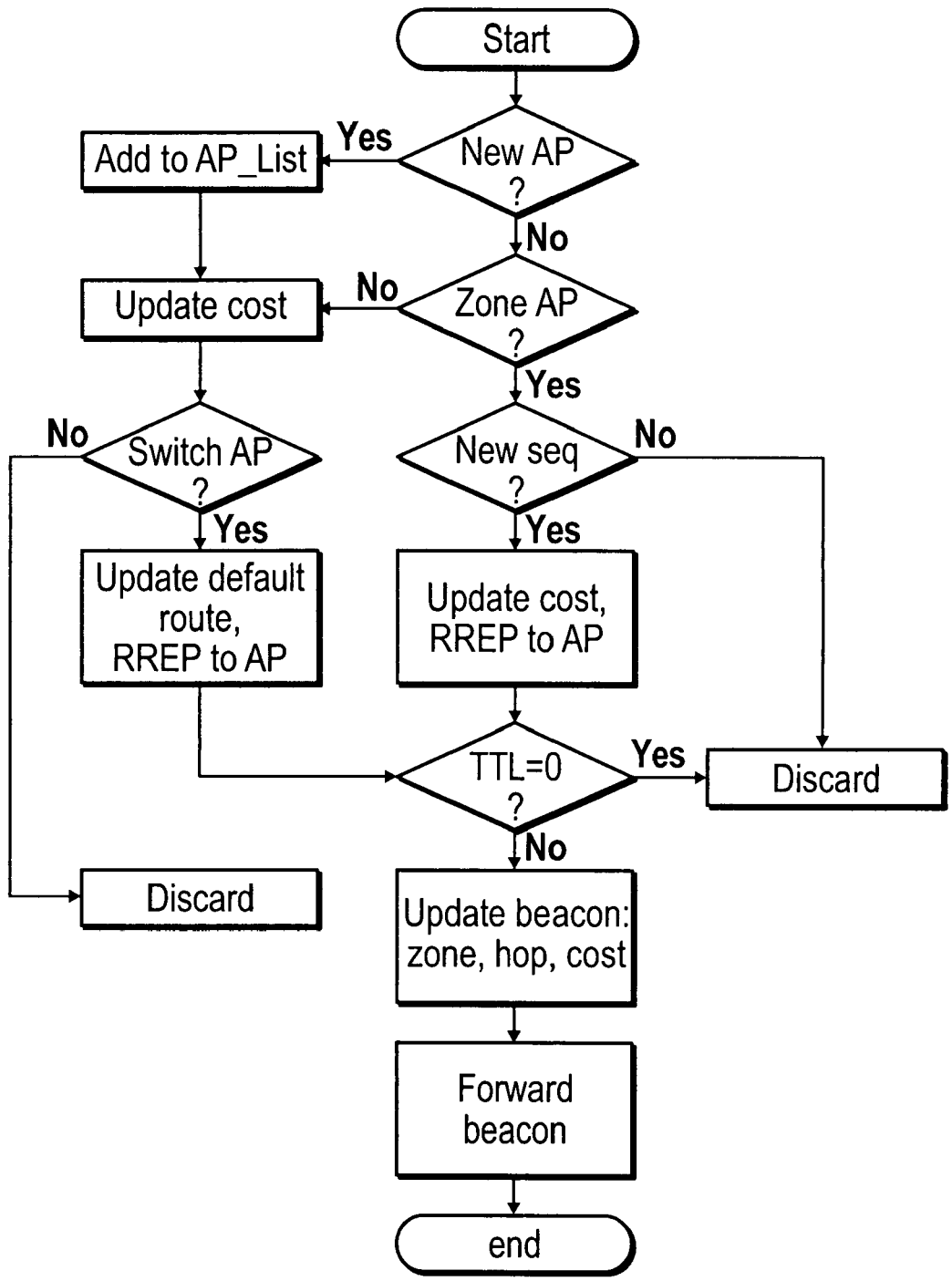
FIG. 2 shows a beacon message format, consistent with an example of the present innovations.
FIG. 3 shows a flowchart consistent with an example of the present innovations.

In preferred embodiments, each AP periodically transmits a beacon (BEACON) message. The format of the beacon message is shown in FIG. 2. The fields AP and seq are the unique AP ID and sequence number of a beacon message. Each AP increments its own beacon sequence number before it sends a beacon message. From the two fields, a node knows whether the message is new or not. The TTL (Time-To-Live) field determines how many hops that a message is to be forwarded. The hop field records how many hops that a message has traveled. The initial cost of a beacon is assigned by the AP according to its traffic load and number of nodes in its zone.

Upon receiving a beacon message, a node processes it according to the flow chart shown in FIG. 3. If the beacon is from a new AP, which is not currently in the AP List of the node, the node adds the AP to its AP List. The AP List of a node maintains the APs that a node can reach. The node only uses the default zone AP to forward data if there is no routing error. If there are errors when a node sends data to its zone AP (such as the links are broken due to mobility), it may use one of the other APs in the list. An example of the AP List is shown in Table 1.

| AP_ID | seq | hops | next hop | cost |
|-------|-----|------|----------|------|
| 0 | 21 | 2 | 15 | 15.93 |
| 1 | 5 | 4 | 11 | 23.11 |
| ... | ... | ... | ... | ... |

The meaning of the fields are dS follows:
AP ID - The unique ID of an AP;
seq - The sequence number of the last beacon from the AP;
hops - The number of hops that a node is axva from the AP;
next hop - The next hop to forward packets to the AP;
cost - The cost of joining the zone of the AR.

After the new AP is added, the node computes the cost to join the new zone (of the new AP). When the cost is lower than the current cost by a given threshold T, the node flips a coin to determine whether it will switch to the new zone or not. In this way, the node does not switch its zone whenever the new cost is lower, thus avoiding the instability (oscillation) effects in zone forming.

If the node switches to the new zone, the node sends a Route Reply (RREP) message to the AP and updates its default route to the new AP. The RREP message is similar to the RREP in AODV. It contains the routing information to the node. The intermediate nodes who forward the RREP message also process the packet and update their route to the RREP source. After that, if the beacon's TTL field is larger than 0, the beacon is again forwarded by the node with an updated hop and cost. If the TTL is zero, the beacon will be discarded.

If the beacon is from the current zone AP, the node checks the sequence number to see if it is a new beacon. If it is new, the node updates its cost to the AP accordingly and replies a RREP. Then the node forwards the beacon with updated hop and cost if the TTL is larger than 0. If the beacon is with an old sequence number, it is discarded.

Upon receiving the RREP message, the zone AP updates the zone topology by maintaining a node list consisting of the nodes in the zone. When a node joins a zone (by sending a RREP to the AP), the AP adds an entry for it in the node list. A default route to each node is updated by the RREP of each beacon. If the AP does not receive the RREP from a node after a certain number of beacons, the node will be removed from the list (i.e., from the zone).

As a node determines which zone it joins according to the cost in each beacon, such cost needs to be properly assigned to achieve load balancing among the zones (APs). The AP preferably assigns an initial cost c0 to a beacon according to the traffic load (in the past beacon interval) across it and the number of nodes in its zone. When a node i receives a beacon, it updates the cost to the AP in its AP List. If the node belongs to the zone or it determines to switch to the zone, it adds its own cost ci to the cost in the beacon and then forwards the beacon. Therefore, the total cost to join a zone is the cost sum of the AP and intermediate nodes, i.e., $$C_{joining} = \Sigma c_i, i \in beaconforwardedpath \qquad (eqn. 1)$$

The support of ad hoc routing enriches the path selections in the network and reduces the potential traffic load through the AP. Hence the multi-hop architecture achieves better load-balancing than traditional WLAN. However, how to select a proper (or optimal) route becomes a more significant issue in a multi-hop WLAN. To address the routing issue, some embodiments of the present innovations include a weighted x-hop routing, for example, one similar to AODV, based on our load-balancing zone forming. The present application uses the topology information obtained in zone-forming to reduce the routing overhead as compare to ad hoc routing.

Three essential separate phases in the routing protocol, will now be discussed.

Beaconing

Preferred embodiments of the routing protocol attempt to trade off the routing requests by the periodical beaconing. Since the beaconing helps the APs and nodes maintain default routes to others in the network, a source may use the default routes to forward data to the desired destination. The requirement of route requests is hence reduced.

As described herein, the beacons preferably not only help a node to select and join a zone, but also allow it to update its default route to its zone AP. To respond the beacon from its zone AP, A node sends a reply message in the form of an AODV-style RREP. It specifies how long the route is valid and is unicast back to the AP. The intermediate nodes also process the message and cache a route with a certain weight to the source node. The weight is the total cost of the intermediate nodes in the cache path. Hence, the AP also has the weights to every node in its zone. In this way, the beaconing mechanism helps the APs and notes to maintain weighted routing information. Depending on different applications, such weight metric can be power, stability or residual bandwidth in a node. In the following discussion, residual bandwidth is used as the simulation metric. Of course, the weight metrics are not limited to those listed here, which are only examples.

Route Discovery

There are three types of route discovery in our protocol for local communications, outgoing or incoming traffic. In the first case, the source and destination are in the same network (e.g., a campus network). The source initials a Route Request (RREQ) flood that is limited to x hops, where x is the number of hops that the source is away from the zone AP. A node with cached route to the destination responds a RREP which consists of a weight to the destination. If the destination replies a RREP, the initial weight is set to zero. The zone AP also replies a RREP to the source with an initial weight from the AP to the destination. When the RREP travels back to the source, the weight will be cumulated by the intermediate nodes. If the source receives multiple RREP, it selects the path with lowest weight to forward data.

If the destination is not in the same network, i.e., the traffic is outgoing, the node preferably directly sends data to its zone AP. The AP will relay the traffic to the desired destination. An AP does not respond to the RREQ from a node which is not in its zone.

If an AP receives an RREQ with a destination in its zone, it preferably sends a RREP with the weight information collected by the most recent beaconing. When an AP receives data orienting a node in its zone, it preferably forwards the data using the route maintained by beaconing. If the route for a specific node is expired, the route recovery is performed by the AP.

Route Recovery

In preferred embodiments of the present innovations, only APs and source nodes perform route recovery. When an AP receives a packet orienting a node with expired route, it preferably triggers a beacon to refresh its zone topology and a route error (RERR) with the destination address to other APs in the network. Upon receiving a RERR message, if an AP has a valid route to the destination, it responds a RREP to the AP sending the RERR. Otherwise, if an AP finds the destination in the next beacon, it sends a RREP to the original AP.

If a source using an ad hoc connection without going through an AP encounters a route error, it uses the path to its zone AP as a backup. On receiving such packets, the AP will forward them to the destination by the default route.

Programming Platform

The present innovations implementation of WIANI and the software architecture are presented here. Regarding software platform, the present innovations contemplate at least the following embodiments:

Driver API Programming

One way of implementing WIANI is to program a device driver which manipulates the wireless LAN card hardware directly using their released Application Programming Interface (API). However, this is not a good solution because the APIs of many wireless LAN cards are not released to programmers and hence are not programmable. As a result, messages exchanged in the network cannot be modified or added. Furthermore, the API for commercially available APs are mostly proprietary. Programming them requires a licensing agreement with the AP vendors, which usually involves high fee. As a result, due to the lack of support of wireless device vendors and cost consideration, implementing WIANI this way is not very practical.

Linux Open-Source Programming

Accessing the hardware directly can be very complex, since there are many different hardware designs for the same wireless LAN card. Thus it is preferred to rely on the kernel, a piece of software responsible for providing access to the machine's hardware. As Linux kernel is an open-source operating system kernel, all of its underlying source code is available to the public. Thus this example of \WIANI is implemented in Linux. In this environment, there are two choices:

Kernel-Space Programming

To program WIANI in kernel-space, we modify the original 802.11 association protocol and routing protocol such as beacon frames and their acknowledgement to support WIANI. The advantage of this approach is that the performance is good, because all operations such as joining and switching a network do not need to go to user-space. However, putting the entire routing protocol in kernel-space is not a good system design (see citation 18 below). The complex protocol processing may consume much memory. Moreover, mass deployment is difficult because users usually are reluctant to modify their kernel. Switching between WLAN and WIANI therefore making backward compatibility more difficult. Another weakness of kernel-space programming is that it does not allow users flexibility.

User-Space Programming

In this approach, we implement WIANI in user-space with least kernel programming, where a user-space daemon is created to control the logic. The daemon makes use of the existing 802.11 interface to control the WLAN card. We adopt this approach in WIANI.

The present innovations preferably use the Wireless Extensions and Wireless Tools as available in Linux kernel version 2.4 or above. Wireless Extensions is a generic API allowing users to configure a driver and obtain network statistics and states in a WLAN card. As drivers nowadays commonly support Wireless Extension, this set of tools supports most of the variations of WLAN cards, regardless of their types. The advantage of this approach is that the network parameters may be changed on the fly without restarting the driver and readily offers compatibility with the existing traditional WLAN. Wireless Tools for Linux is a set of tools allowing the manipulation of functions in Wireless Extensions. It provides useful functions such as the followings:

iwconfig: manipulates the basic wireless parameters;

iwlist: allows user to initiate channel scanning and list channel frequencies, bit-rates, encryption keys, etc.;

iwspy: gets the link quality of the channel;

iwpriv: manipulates the Wireless Extensions specific to a driver.

Address Configuration

The present innovations preferably use a mechanism in WIANI to dynamically allocate IP addresses to mobile nodes so that packets may be routed inside and outside a zone. Recently, some address autoconfiguration protocols for Mobile Ad-Hoc Networks (MANETs) have been proposed. Most of them are stateless approach which is suitable for a network without a central entity. These protocols are not suitable for WIANI because there are APs providing services to the nodes in WIANI.

For traditional WLAN, a stateful approach such as DHCP (dynamic host configuration protocol) is widely deployed. A DHCP server reachable by all nodes assigns unique addresses to mobile nodes and keeps state information of addresses already assigned in an address allocation table.

Figure 4:
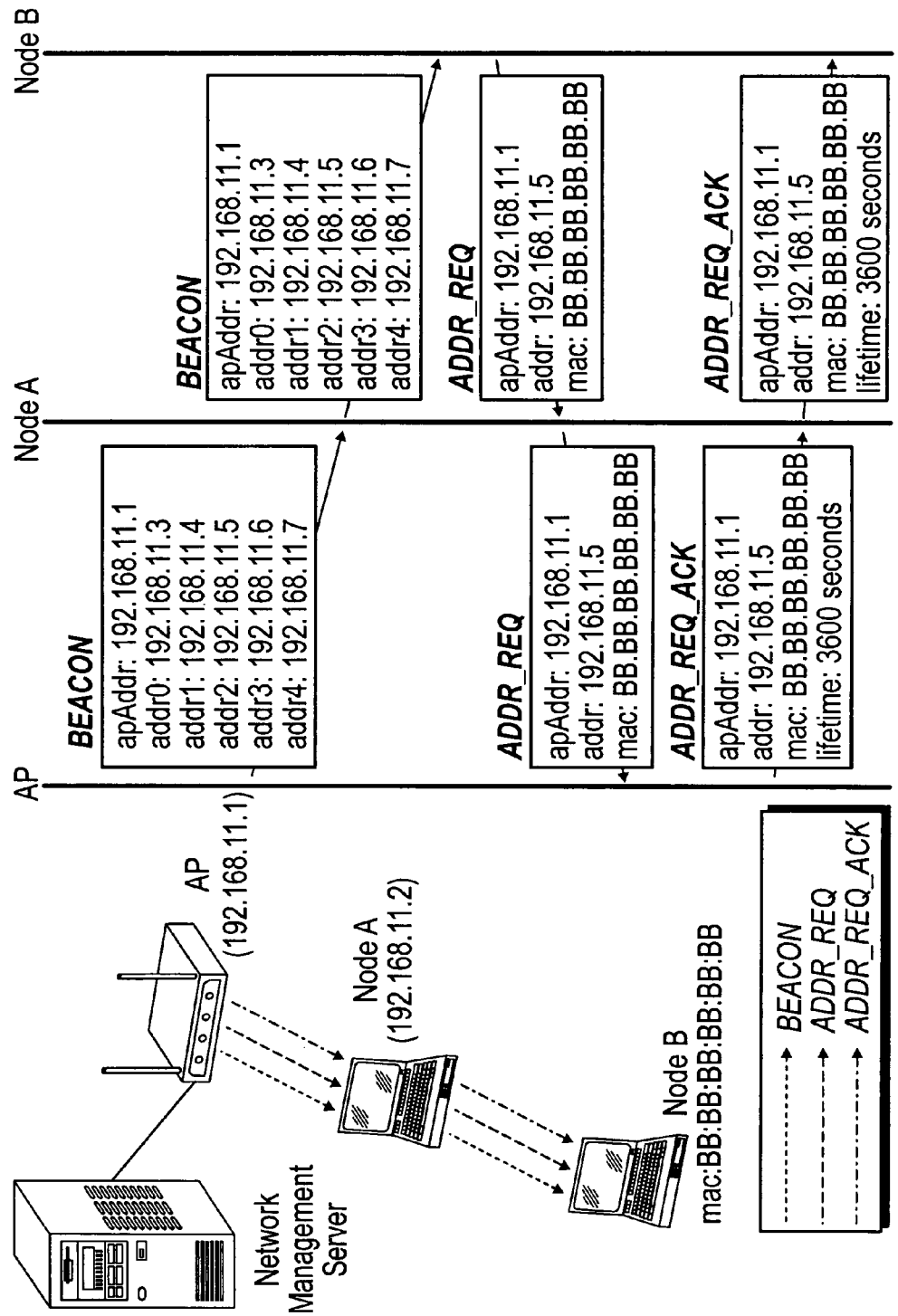
FIG. 4 shows a scheme for obtaining an IP address for a mobile node in WIANI consistent with an example of the present innovations.

In WIANI, a slightly modified approach is adopted. The beacon message contains a list of available IP addresses at the AP. FIG. 4 shows an embodiment of the address resolution as used in WIANI, where we show a new node (Node B) joining the network on the left and the time-space diagram on the right. The AP broadcasts the BEACON message with IP addresses to node A, which in turn broadcasts to node B. Node B may receive multiple beacons. After deciding which AP to join, it randomly chooses an IP address in the BEACON message and broadcasts an ADDR REQ message back to the AP. The ADDR REQ contains the AP address so that the intermediate node knows how to forward the message. ADDR REQ also contains the MAC address of the arriving node (Node B in FIG. 4). After the arrival of ADDR REQ, the AP responds with an ADDR-REQ ACK acknowledgement message which contains the information of ADDR REQ and the lifetime of the IP address (which is the amount of time the IP address is valid). If the arriving node does not receive an ADDR REQ ACK, it chooses another IP address in the same or another BEACON and repeats the process. When the IP address of the arriving node becomes invalid, the node sends an ADDR REQ to renew its address.

Dynamic Zone Forming Algorithm and Implementation

As the driver code of many wireless access point is not released to the public, the present innovations can (in some embodiments) use a desktop PC with both wired and wireless interface to act an AP. From the client perspective, there is no difference between a commercial access point and our simulated access point. A user-space daemon is created to implement the zone forming algorithm. Wireless Extensions and Wireless Tools are used in setting the parameters for wireless communication.

We program WIANI AP to work in the standard IEEE 802.11 ad-hoc mode. It broadcasts beacons periodically to gather and maintain the zone information and makes itself known to the mobile nodes in its zone. The format of the beacon message is shown in FIG. 5. The apId field stores the IP address of an AP. The seq field is the sequence number of a beacon message. The AP first randomly chooses a sequence number (16-bit integer) and increments it for each new beacon message. The ttl (Time-To-Live) field indicates the number of hops that the message is forwarded. The hop field records how many hops that a message has traveled indicated at the AP as 0. Both the ttl and hop are 8-bit integer. The cost field indicates the current cost of joining the AP, initialized by the AP according to its traffic load and number of nodes in its zone.

The BREP message has the same format as the BEACON with msgType equal to 2 where BEACON message has msgType equal to 1. There are two types of BREP message. They are association request and dissociation request.

The WIANI AP keeps a list of nodes it serves. The code fragment to handle the incoming message and to maintain network topology is shown in FIG. 6. If the AP receives a BEACON message, it simply ignores it. Upon receiving a BREP message, if it is an association request, the AP adds the source node to its node list if it is new. On the other hand, if the node is already in the list, the AP updates the next hop and cost to the node. However, if the BREP message is a dissociation request, the AP then removes the source node from its node list and updates its cost according to the traffic load and the number of nodes in its zone.

A mobile node associates itself with AP by sending a reply in unicast. Each mobile node maintains an apList, a list of reachable APs. The code fragment for a mobile node to handle the beacon message is shown in FIG. 7. Whenever a BEACON message is received, a mobile node first extracts the apId field to see whether the AP is already in its apList. If it is not, the mobile node creates an ApListEntry object and adds it to the apList. The mobile node subsequently checks if the cost to join the new zone is lower than the current cost by a given threshold. If so, the mobile node switches to the new zone by flipping a coin. In this way, the node does not switch its zone whenever the cost is lower, thus avoiding oscillation. If it switches to the new zone, it updates its default route to the new zone-AP and sends a BREP message to dissociate its default AP and associate with the new zone-AP. On the other hand, if the key apId is already in the apList, the mobile node checks whether the AP is its zone-AP. If not, i.e., it is an AP from the other zone, then the node does the same thing as in the previous situation without adding a new ApListEntry object to the apList. If the BEACON is from the zone-AP and is a new BEACON (had a new sequence number), the node updates the AP cost and sends a BREP message to the zone-AP. Finally, fwdBeacon( ) checks whether ttl field is greater than zero or not. If so, the ttl, hop and cost fields are updated and the BEACON is broadcast to the other nodes.

Weighted X-Hop Routing and Implementation

An important observation is that IEEE 802.11 ad-hoc mode does not support multi-hop. FIG. 8 shows a multi-hop scenario. Even though node A can talk to B which can talk to C, node A cannot talk to C through B in IEEE 802.11. Given that IEEE ad-hoc mode does not support multi-hop automatically, we need to implement our own routing algorithm. We propose a weighted x-hop routing, for example, similar to AOVD. We use the topology information obtained in zone-firming to reduce the routing overhead as compared to other ad-hoc routing implementations.

Figure 9:
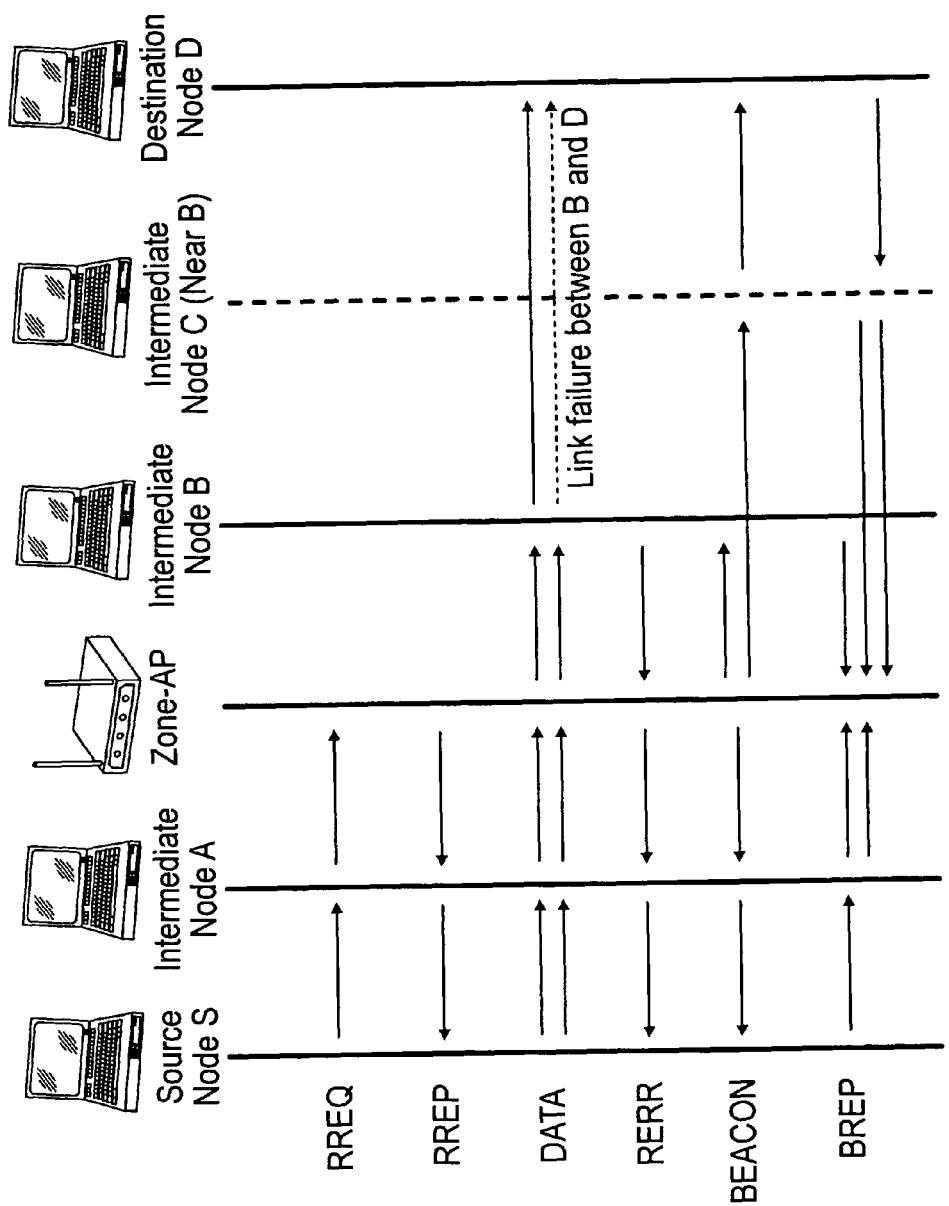
FIG. 9 shows an example weighted x-hop routing protocol messaging consistent with an example of the present innovations.

Weighted x-hop routing is a reactive routing protocol. Routes are determined when needed. If a source has data to transmit to an unknown destination, the route discovery process starts. There are three types of route discovery in WIANI:

Local communication: FIG. 9 shows the protocol messaging. When a source (Node S) wants to transmit data to an unknown destination (Node D), the source initializes a Route Request (RREQ) flood that is limited to x hops, where x is the number of hops (x equals 2 in FIG. 9) that the source is away from the zone-AP. If the intermediate node (Node A) which, received the RREQ has no route to the destination, it rebroadcasts the RREQ. A node with cached route to the destination replies a RREP to the source. An additional field WEIGHT is added to the AODV RREP message in WIANI with initial weight zero. The zone-AP also replies a RREP to the source in unicast with an initial weight from the AP to the destination. As the RREP propagates, each intermediate node updates WEIGHT in RREP and creates a weighted route to the destination. If the source receives multiple RREPs, it selects the path with the lowest weight to forward the data.

Out-zone communication: If the destination is not in the same network, i.e., the traffic is outgoing, the node directly sends data to its zone-AP in unicast. The AP then relays the traffic to the desired destination.

In-zone communication: If an AP receives data destined to a node in its zone from the Internet, i.e., the traffic is incoming, it forwards the data using the route it cached. If the route for a specific node is expired, the AP triggers a BEACON message to refresh its zone topology.

If a node (Node B) detects link failure (Link B-D) during transmission, it sends a Route Error (RERR) to the source. The intermediate node receiving RERR invalids routes to the unreachable destination. Upon receiving the RERR message, the AP then triggers a BEACON message to refresh its zone topology and sends a RREP to the source. In FIG. 9, from the received Beacon Reply (BREP) message, the AP finds another route to Node D through C. On the other hand, if a node detects link failure in a standalone ad-hoc network, it uses the path to its zone-AP to forward its data.

There are several AODV routing protocol implementations in recent years, including AODV-UU, AODV-UCSB, AODV-UIUC and Kernel-AODV. The present innovations may implement on-demand routing in two preferred ways (though other ways are possible). The first way is direct kernel implementation. The kernel code is modified to handle the routing and packet forwarding. Another way is to implement a user-space daemon which keeps as much as logic as possible out of the kernel.

Figure 10:
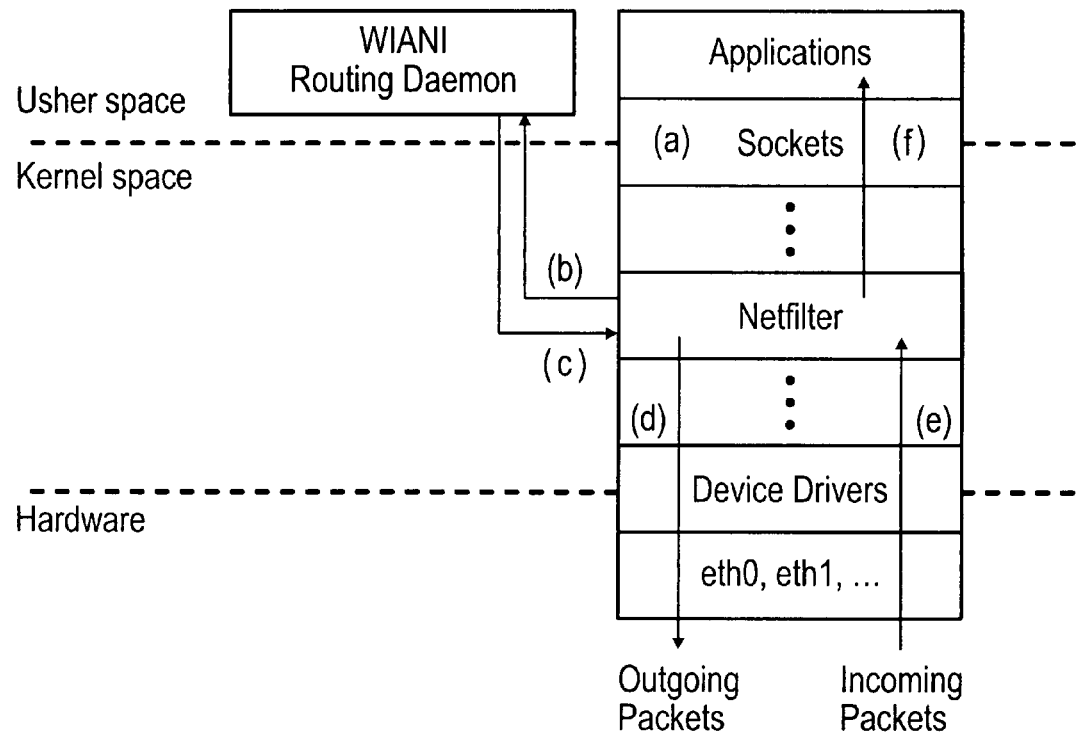
FIG. 10 shows WIANI routing architecture consistent with an example of the present innovations.

We implement weighted x-hop routing by adopting what has been developed in AODV-UU, which is a user-space routing daemon maintaining kernel routing table. Netfilter is used to capture packets in the kernel space. FIG. 10 shows the WIANI routing architecture. When a data packet is passed (arrow a) from an application to the network stack, it is captured by Netfilter inside the Linux kernel. The packet is passed (arrow b) to the WIANI routing daemon which decides the need for on demand routing. If there is no valid route for the destination, the routing daemon does the route discovery process and passes (arrow c) the packet back to the Netfilter. After that, the packet is passed (arrow d) back to the network stack.

When an incoming packet is filtered by Netfilter (arrow e), it is passed to the WIANI routing daemon to make the routing decision. If the result is to forward the packet to another node, the packet is passed (arrow d) back to the network slack. If the packet is destined to the processing node, the packet is passed (arrow f) up to the application layer.

Detailed Examples

This section presents the simulation results of load-balancing routing (LBR) protocol in WIANI. We have also implemented WIANI in Linux environment and carried out an experiment to verify the performance benefit of WIANI. We primarily examined the impact of multi-hop extension on wireless infrastructure network in terms of wireless coverage, load-balancing capability and data throughput. Our results show that WIANI can lead to significant improvement in terms of these performance metrics.

Simulation Setup

In preferred embodiments, the protocol, is implemented using NS 2 (version 2.27) with CMU wireless extension. The common parameters for all the simulation runs are listed in Table 2, which are similar to those in. We compare our results to AODV and the k-hop routing protocol (KRP) proposed in.

| Transmission Range | 250 m |
| --- | --- |
| Radio Propagation Model | Two-ray ground |
| Simulation Duration | 120 s |
| Mobility Model | Random way-point |
| Pause Time | 0 s |
| Medium Access Protocol | IEEE 802.11 DCF |
| Link Bit-Rate | 1 Mb/s |
| Packet Size | 1000 bytes |

Figure 11:
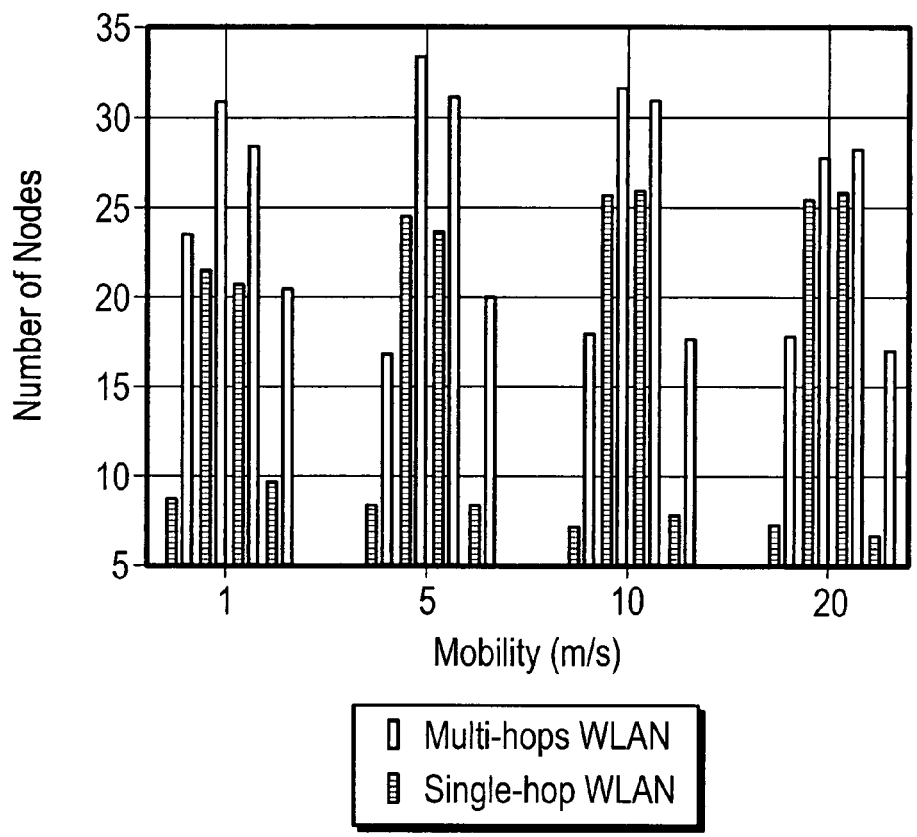
FIG. 11 shows a number of nodes served in comparison to a single hop WLAN.

For experiments, we choose 100 mobile nodes to roam around a rectangular area of 2400 m×600 m at four different speeds of 1, 5, 10 and 20 m/s. Four APs are placed 600 m apart and 300 m from the top and bottom of the simulation area. Each data, point in the results are the average of 5 runs of different traffic files. The generated traffic is comprised of TCP or UDP (constant bit rate of 50 kb/s) communications between mobile sources and sinks. We use the random way-point mobility model with a distribution of 15:35:35:15 for each 600 m×600 m squared areas (for both original positions and motion destinations of the mobile nodes). The mobile nodes move in a velocity from 1 to 20 m/s. The beacon interval in all APs is set to 3 seconds. Our initial set of tests involves a network with 30 active connections (10 inner connections, 10 outgoing ones and 10 incoming ones). In FIG. 11, we show the distribution of the number of nodes served by the APs in a traditional single-hop wireless LAN versus in a multi-hop wireless LAN with load-balancing zone forming. Clearly, not only the number of nodes served is significantly improved, but the distribution of nodes served by different APs are more uniform. Therefore, Our zone forming scheme achieve substantially better load-balancing.

Results

In the following, we compare our results to AODV and the k-hop routing protocol (KRP) proposed in in term of: 1) end-to-end path latency, 2) packet delivery ratio (PDR), and 3) network throughput.

Figure 12:
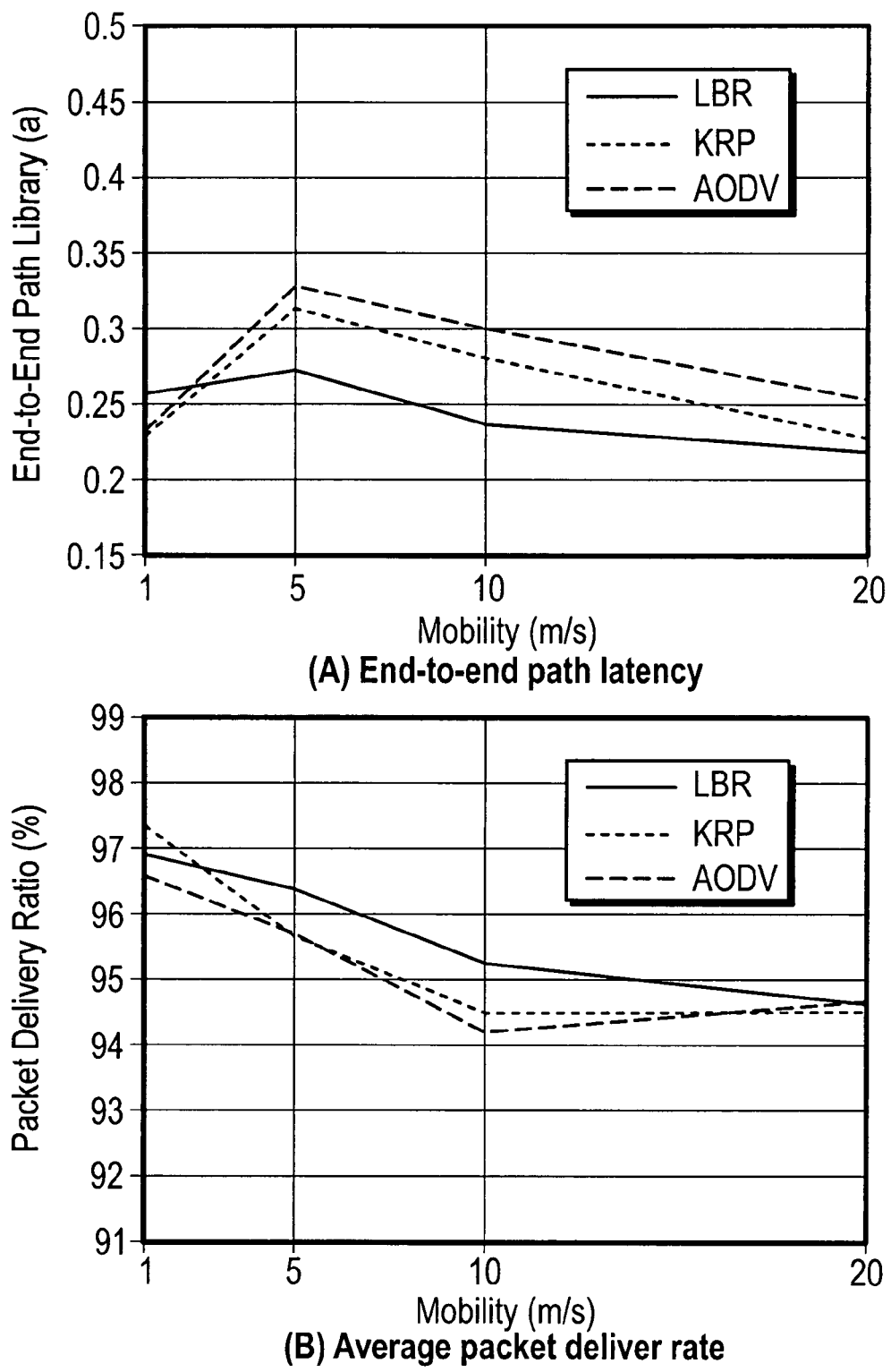
FIG. 12 shows a performance comparison among LBR, KRP, and AODV.

We plot in FIG. 12 (a) the average end-to-end path latency of the active connections versus different mobility velocity. In most cases, LBR achieves shorter end-to-end delay comparing to AODV and KRP.

In FIG. 12 (b), we plot the packet delivery ratio defined by the percentage of packets that reach their destination over the total packets generated. Clearly, as mobility velocity increases, the PDR of the three schemes decreases accordingly because link errors are more likely to happen in higher mobility environments. However, our LBR have higher PDR comparing to the other two schemes.

Figure 13:
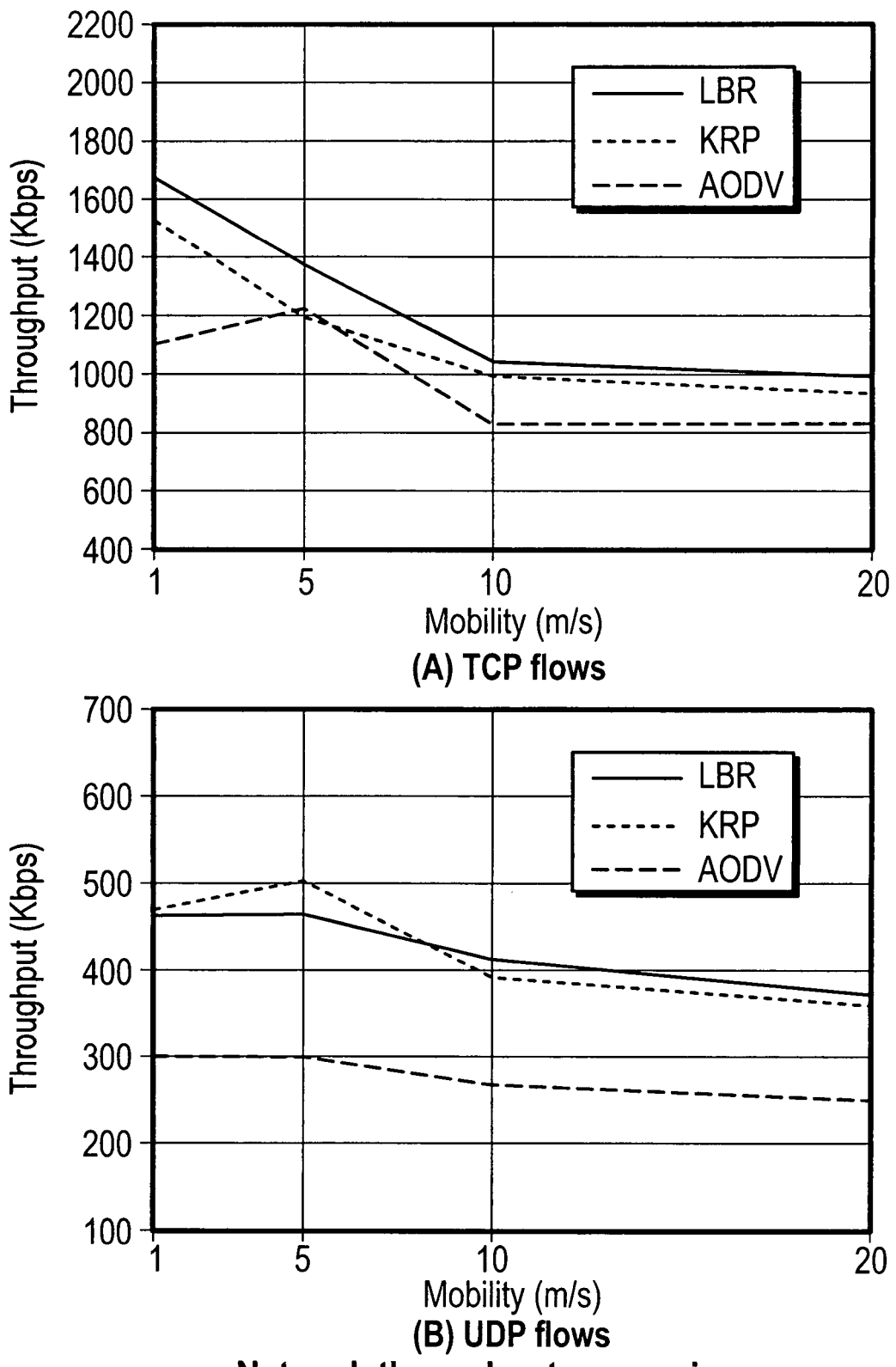
FIG. 13 shows a network throughput comparison.

FIG. 13 shows the network throughput using both TCP and UDP traffic flows. In both cases, the network throughput de-creases with respect to mobility velocity due to the same reason as in PDR. Our LBR achieves consistently higher throughput when TCP flows are used. When UDP flows are used, LBR and KRP have similar throughput which is higher than AODV.

Experimental Setup

Experiments were performed on the 2nd floor of the Post-graduate Hall II at the Hong Kong University of Science and Technology (HKUST). The experimental setup is outlined in the map of FIG. 14. The example network consists of two WIANI access points (APs). We present the approximate wireless coverage of each AP by shaded circular areas as indicated in the figure. Each AP is connected to a wired local area network (LAN) which is connected to the Internet. A proprietary network management server is connected to the LAN to provide a common address allocation table for the APs.

The APs are laptops with Mobile Intel Pentium III 850 MHz processor, 128 MB ram and Ethernet adapter. For wireless connectivity, Cisco Aironet IEEE 802.11b wireless cards were used. For the comparison with traditional infrastructure mode WLAN, we used two Buffalo AirStation IEEE 802.11b APs. Note that such an arrangement is actually disadvantageous to WIANI. Traditional APs are network layer devices whereas WIANI APs are laptops running a user-space daemon. The data packets in WIANI encounter additional delay due to application layer processing.

The mobile nodes are laptops with Intel Pentium III 650 MHz processor and 128 MB ram. They are all equipped with Cisco Aironet IEEE 802.11b wireless PCMCIA card. The operating system used was Linux Fedora Core 4 with kernel version 2.6.11. The application considered is FTP file transfer. A FTP server is connected to the same LAN as the APs. We measured the total transfer time of downloading and uploading a 17 MB video file from and to the FTP server respectively. Each node also runs a FTP server program named vsftpd which is used in the measurement of local, communication. The data transfer statistics were obtained from the Linux Arpanet FTP program. We then compare the data throughput of WIANI and that of traditional WLAN.

Of course, the scope of the experimental data and specific examples used therein are not intended to indicate limits to embodiments of the present innovations, and only serve as examples.

Measurement Results

Figure 14:
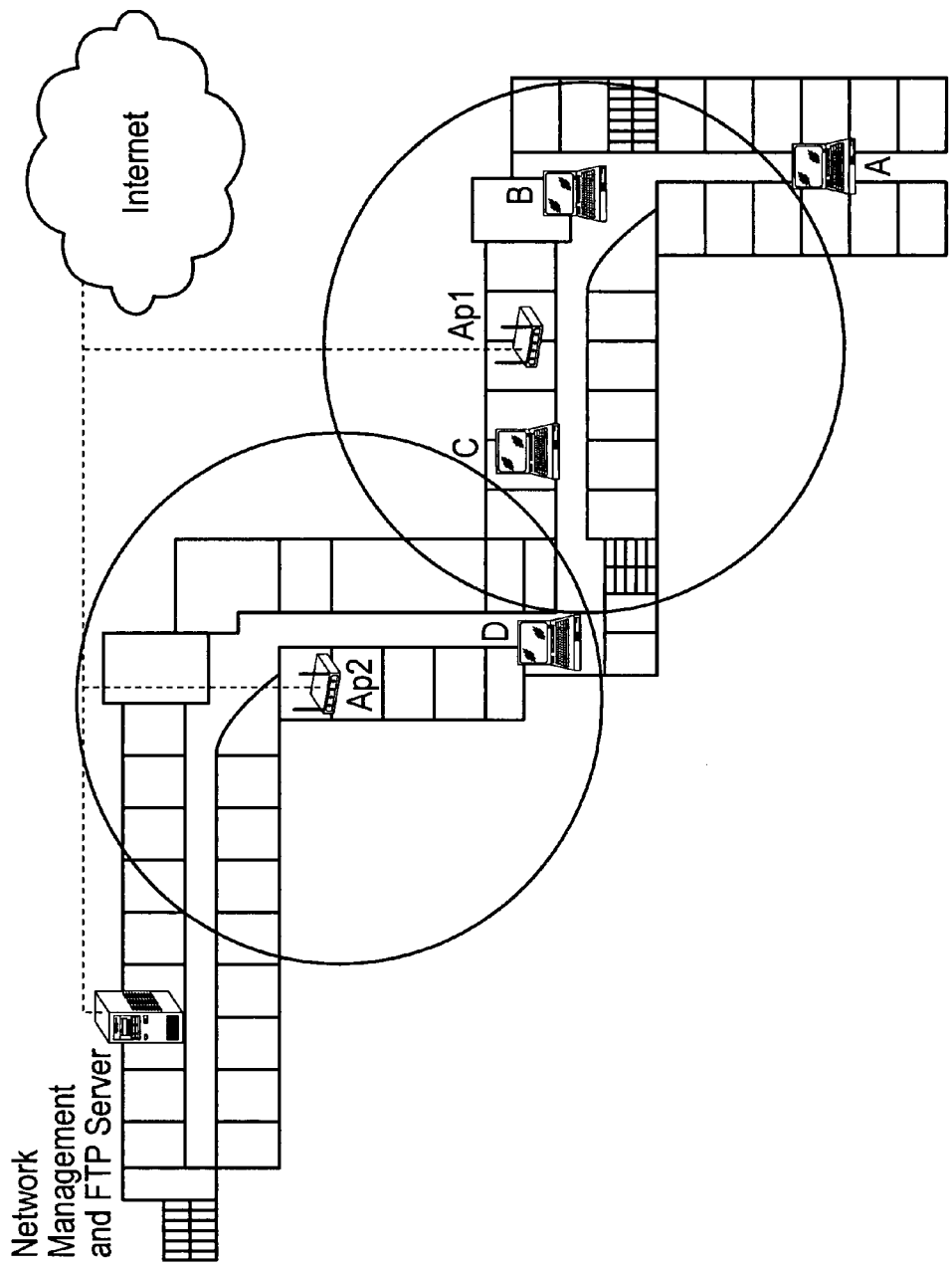
FIG. 14 shows an experimental setup consistent with implementing an example embodiment of the present innovations.
Figure 15:
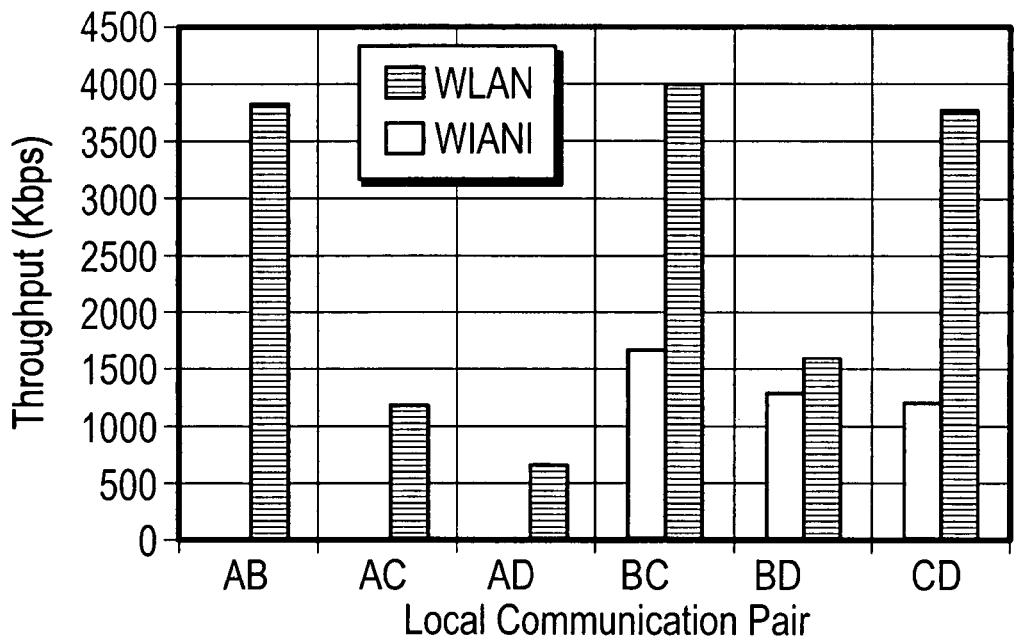
FIG. 15 shows a comparison of the local communication throughput between traditional WLAN and WIANI.

FIG. 15 shows the comparison of local communication data throughput between traditional one-hop WLAN and WIANI. Traditional WLAN cannot offer service to nodes outside the coverage area of an AP. In FIG. 14, node A is outside the service set of AP1. It is unable to communicate with any nodes in the network because it should rely on the AP's service. So, the data throughput of local communication pair AB, AC and AD are all zero. With WIANI, node A can now communicate with node B, C and D through the local ad-hoc data connection. This shows the wireless coverage extension of WIANI.

Another observation is that the data throughput will decrease with the number of hops in the ad-hoc communication path. It can be seen from data throughput which involves A in FIG. 15. The hop count of AB, AC and AD is 1, 2 and 3 respectively and the data throughput is inversely proportional to the hop count. This is due to the routing and forwarding overhead in the multi-hop scenario.

In traditional WLAN, the uplink and downlink connections cut the throughput substantially, leading to a waste of bandwidth. This can be observed from the result of communication pair BC, BD and CD. In FIG. 14, nodes B and C belong to the same zone whereas node D belongs to another zone. In WLAN, node B communicate with node C via AP1. It requires both the uplink and downlink connections for a single data transfer. In WIANI, nodes B and C use ad-hoc communication to transfer data without AP's service and hence achieve better data throughput. The benefit of WIANI in terms of data through-put is more obvious in communications D and CD. In traditional WLAN, node D communicates with nodes B and C via AP2 and AP1. This involves at least three connections for a single data transfer. The number of connections is increased if AP, and AP2 are connected with one or more network devices like router. In WIANI, node D communicates directly with node C. It communicates with node B via node C which involves two hops connection. In both cases, it obtains higher data throughput than the traditional WLAN setting.

Figure 16:
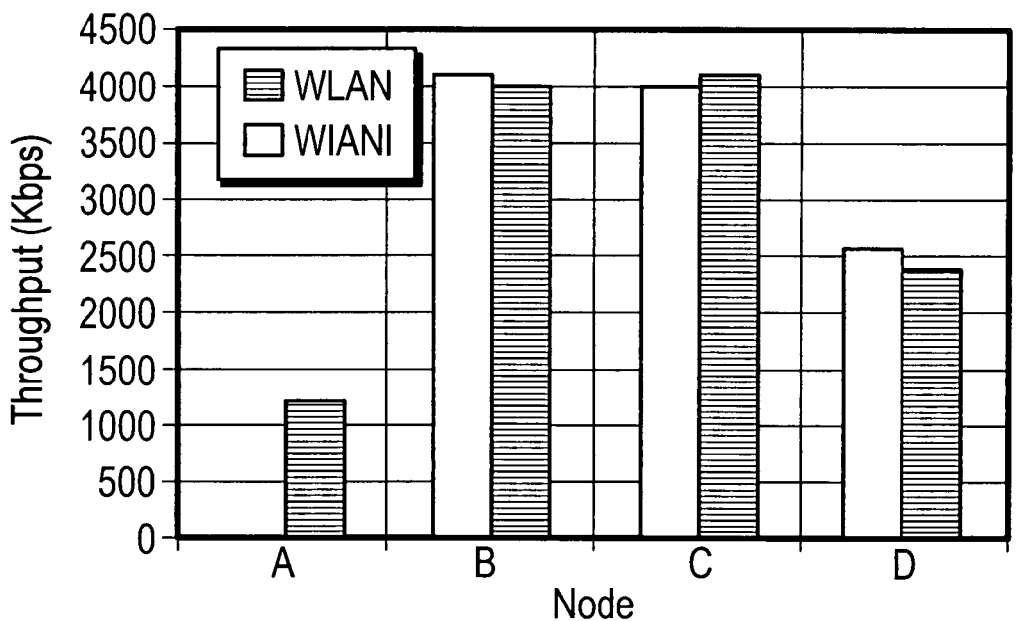
FIG. 16 shows a comparison of the Internet throughput between traditional WLAN and WIANI.

FIG. 16 shows the comparison of the throughput of nodes to and from the Internet between traditional one-hop WLAN and WIANI. We connect a FTP server to the same LAN as the APs to do measurement so that the comparison is focus in the wireless network. In traditional WLAN, it is not possible for node A to communicate with the Internet (the FTP server in the figure) and therefore get zero data throughput. With WIANI, node A connects to AP, via node B, hence extending the Internet coverage. The data throughput achieved by nodes B, C and D are at the similar level for both traditional WLAN and WIANI. It is because nodes in both WLAN and WIANI behave more or less the same in the Internet connection.

WIANI also increases the load-balancing capability among APs. In FIG. 14, node 1D can receive the BEACON message from AP1 and AP2. The cost in BEACON from AP1 is higher than that of AP2 since the associated nodes of AP1 is higher. Therefore, node D associates itself to the zone of AP2. As a result, the hot-spot congestion problem can be relieved with improved total network capacity.

According to a disclosed class of innovative embodiments, there is provided: A method for using ad-hoc wireless network connectivity from a mobile access point, comprising the actions of: intermittently broadcasting a beacon message from at least one of a plurality of access points, each said beacon message including a cost function value indicative of capacity through that access point, and also including a counter which permits a hop count of the beacon message to be monitored by any user node which receives the beacon message; and in individual ones of said user nodes, monitoring said hop count and said cost function, and selectively changing association and/or routing to ones of said access points in dependence thereupon.

According to a disclosed class of innovative embodiments, there is provided: A method of managing wireless coverage, comprising the steps of: at a receiving node, receiving a beacon from an access point; if the beacon is from a new access point, then: adding the new access point to the receiving node's list of access points; computing a cost to join the zone of the new access point; and if the cost to join the zone of the new access point is lower than current cost by a given threshold, determining whether to switch to the new zone as default zone; and if the beacon is from a current access point, updating the cost to the current access point if the beacon is new; and forwarding the beacon with updated hop and cost if the time to live is greater than zero.

According to a disclosed class of innovative embodiments, there is provided: A method of managing access by multiple nodes to multiple access points, comprising the steps of: periodically transmitting a beacon from the access point; wherein a cost field of the beacon is assigned by the access point according to its traffic load and number of nodes in its zone; at a receiving node, if the access point is new, updating cost; determining whether to switch access points; and sending a route reply to the access point; if the access point is not new, updating cost to the access point if the received beacon is new; and sending a route reply to the access point; wherein route reply messages update the default route between the node and the receiving access point.

According to a disclosed class of innovative embodiments, there is provided: A system for managing wireless connectivity, comprising: a plurality of access points, the access points configured to transmit a beacon to a plurality of nodes, each access point having a zone; wherein the plurality of nodes are configured to send reply messages to access points and, in dependence on the content of beacons received from access points, switch from a first access point to a second access point; and update cost to access points and the default route between a sending node and a receiving access point.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Additional general background, which helps to show variations and implementations, may be found in the following publications, all of which are hereby incorporated by reference:

1. IEEE Standards Board, "Wireless LAN Medium Access Control (MAC) and Physical Layer (PHY) Specifications," IEEE Std 802.11-1997, November 1997.
2. J.-C. Chen, S.-H. Chan., J.-Y. He, and S.-C. Liew, "Mixed-mode wlan: The integration of ad hoc mode with wireless lan infrastructure," in Proceedings of IEEE (Globecom '03. San Francisco, Calif.: IEEE, December 2003. (Online). Available: http://www.cs.ust.hk/faculty/gchan/papers/g03 M2.pdf
3. J.-C. Chen, J.-Y. He, and S.-H. Chan, "A framework to relieve wireless hot-spot congestion by means of ad hoc connections," in Proceedings of IEEE International Conference on Mobile and Wireless Communications Networks (MWCN). Singapore: IEEE, October 2003.
4. W. List and N. Vaidya, "A routing protocol for k-hop networks," in WCNC 2004, March 2004. (Online). Available: http://www.crhc.uiuc.edu/wireless/papers/khop-wene.pdf
5. S. Lee, S. Banerjee, and B. Bhattacharjee, "The case for a multi-hop wireless local area network," in Infocom 2004. Hong Kong: IEEE, March 2004.
6. E. M. Royer and C.-K. Toh, "A review of current routing protocols for ad-hoc mobile wireless networks," in IEEE Personal Communications. IEEE, April 1999, pp. 46-55.
7. C. E. Perkins and P. Bhagwat, "Highly dynamic destination-sequenced distance vector routing (DSDV) for mobile computers," in ACM SIGCOMM'94, London, UK, 1994, pp. 234-244.
8. C. E. Perkins and E. M. Royer, "Ad hoc on-demand distance vector routing," in the 2nd IEEE Workshop on Mobile Computing Systems and Applications, New Orleans, La., February 1999, pp. 90-100.
9. D. Johnson, D. Maltz, and J. Broch, DSR: The Dynamic Source Routing Protocol for Multihop Wireless Ad Hoc Net-works. Addison-Wesley, 2001, ch. 5, pp. 139-172.
10. R. Draves, J. Padhye, and B. Zill, "Comparison of routing metrics for static multi-hop wireless networks," in ACM. SIGCOMM. Portland, Oreg.: ACM, August 2004.
11. H. Wu, C. Qiao, S. De, and O. Tonguz, "Integrated cellular and ad hoc relaying systems: iCAR," IEEE Journal on Selected Areas in Communications, vol. 19, no. 10, pp. 2105-2115, 2001.

12. E. Y. and O Tonguz, S. Mishra, H. Wu, and C. Qiao, "Efficient dynamic load balancing algorithms using iCAR systems: a generalized framework," in Proceedings of Vehicular Technology Conference, VTC2002. IEEE, Fall 2002, pp. 586-590.
13. E. H.-K. Wu, Y.-Z. Huang, and J.-H. Chiang, "Dynamic adaptive routing for heterogeneous wireless network," in Proceedings of Global Telecommunications Conference, 2001. IEEE, 2001, pp. 3608-3612.
14. Y.-D. Lin, Y.-C. Hsu, K.-W. Oyang, T.-C. Tsai, and D.-S. Yang, "Multihop wireless IEEE 802.11 LANs: a prototype implementation," in Proceedings of IEEE International Conference on Communications, 1999. IEEE, 1999, pp. 1568-1572.
15. L. Du, J. Bigham, and L. Cuthbert, "A bubble oscillation algorithm for distributed geographic load balancing in mobile networks," in Infocom 2004. Hong Kong: IEEE, March 2004,
16. Y. Ganjali and A. Keshavarzian, "Load balancing in ad hoc networks: Single-path routing vs. multi-path routing," in Infocom 2004, IEEE, Hong Kong: IEEE, March 2004.
17. S.-C. Huang and R.-H. Jan, "Energy-aware, load balanced routing schemes for sensor networks," in International Conference on Parallel and Distributed Systems. IEEE, July 2004, pp. 41.9-425.
18. V. Kawadia, Y. Zhang, and B. Gupta, "System services for implementing ad-hoc routing protocols," in Proceedings of International Conference on Parallel Processing Workshops. IEEE, August 2002.
19. http://www.hpl.hp.com/personal/Jean Tourrilhes/Linux/Linux.Wireless.Extensions.html.
20. http://www.hpl.hp.com/personal/Jean Tourrilhes/Linux/Tools.html.
21. K. Weniger and M. Zitterbart, "Address autoconfiguration in mobile ad hoc networks: current approaches and future directions," IEEE Network Magazine, vol. 18, no. 4, pp. 6-11, July 2004.
22. http://core.it.uu.se/AdHoc/AodvUUImpl.
23. http://moment.cs.ucsb.edu/AODV/aodv.html.
24. http://w3.antd.nist.gov/wctg/adov kernel/.
25. http://www.netfilter.org/.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for an access point (AP), the method comprising:
   intermittently broadcasting, by the AP, a beacon message to be forwarded among a plurality of node devices to solicit joining a zone of the AP;
   receiving, by the AP, a reply message in response to the beacon message from a first node device of the plurality of node devices; and
   updating, by the AP, a list of node devices in the zone based on the reply message;
   wherein the zone of the AP includes second node devices of the plurality of node devices, and each of the second node devices has a default route to the AP through one or more hops.

2. The method of claim 1, wherein the beacon message includes a value in a first field indicating a cost to join the zone of the AP, and the value in the first field is configured to be updated each time the beacon message is forwarded.

3. The method of claim 1, wherein the AP has an initial cost value and each of the plurality of node devices has a corresponding cost value, and the value in the first field of the beacon message is configured to include a sum of the initial cost value of the AP and the cost value of third node devices of the plurality of node devices located on a route through which the beacon message is forwarded.

4. The method of claim 1, wherein the AP is informed, by the reply message, about the first node device joining the zone of the AP, or the AP is provided with, by the reply message, updated routing information of the first node device if the first node device is already in the zone of the AP.

5. The method of claim 1, wherein the beacon message further includes a value in a second field indicating a number of hops that the beacon message is to be forwarded.

6. A method of managing wireless coverage, comprising:
   receiving, by a receiving node, a beacon message;
   if the beacon message is from a new access point (AP) that is not included in a list of APs of the receiving node, then:
      adding, by the receiving node, the new AP to the list;
      computing, by the receiving node, a cost to join a zone of the new AP; and
      if the cost for the receiving node to join the zone of the new AP is lower by a given threshold than a cost to remain in a zone of another AP, which is already included in the list, then determining, by the receiving node, whether to switch to the zone of the new AP as a default zone; and
   if the beacon message is from one of the APs in the list other than the new AP, then:
      updating, by the receiving node, a cost to remain in a zone of said one of the APs based on information contained in the beacon message; and
      forwarding, by the receiving node, the beacon message with the updated cost if a time-to-live of the beacon message is greater than zero.

7. The method of Claim 6, further comprising if the receiving node changes zones:
   sending, by the receiving node a route reply message to the new AP; and
   updating, by the receiving node, a default route to the new AP.

8. The method of claim 7, wherein the routing information in the route reply message sent by the receiving node is configured to be updated at intermediate nodes between the receiving node and the new AP.

9. The method of claim 7, wherein the route reply message is sent by the receiving node to enable the new AP to update a zone topology that includes a list of nodes in the zone of the new AP.

10. The method of claim 7, wherein the route reply message sent by the receiving node enables intermediate nodes between the receiving node and the new AP to process the route reply message so as to cache a route with a weight.

11. The method of claim 10, wherein the weight includes a total cost of the intermediate nodes in the cached route to join the zone of the new AP, so as to enable the new AP to have the weights of every node in its zone.

12. The method of claim 10, wherein the weight is a metric indicative of power, stability, or residual bandwidth in a node.

13. The method of Claim 6, wherein the route reply message includes routing information to the receiving node.

14. The method of claim 6, further comprising if the time-to-live of the beacon message from said one of the APs is greater than zero:
  updating, by the receiving node, a hop field of that beacon message.

15. The method of claim 6, further comprising:
  not sending, by the receiving node after a predetermined number of beacon messages, a route reply message to a particular AP in the list that sent the beacon messages, so as to enable the receiving node to be deleted from that access point's list of nodes.

16. The method of claim 6, wherein the cost to join the zone of the new AP depends on a traffic load at the new AP and a number of nodes in the zone of the new AP.

17. A method comprising:
  receiving, by a node device, a beacon message transmitted from an access point (AP),
    wherein the beacon message includes a cost field that is based on a traffic load and a number of nodes in a zone of the AP;
  if the AP is not included in a list of APs of the node device:
    determining, by the node device, whether to switch to the zone of the AP; and
    sending, by the node device, a route reply message to the AP;
  if the AP is included in the list of APs of the node device:
    updating, by the node device, the cost field of the beacon message; and
    sending, by the node device, a route reply message to the AP that is included in the list;
  wherein the route reply messages provides an updated default route between the receiving node and the AP.

18. The method of claim 17, wherein the beacon message includes an AP identifier field, a beacon count field, a time-to-live field, a hop field, and the cost field.

19. A method, comprising:
  receiving, by a first of a plurality of node devices, a beacon message from an access point (AP), the beacon message being configured to solicit joining a zone of the AP;
  determining, by the first node device, if the AP is new by checking a list of APs of the first node device, wherein the AP is new if not included in the list; and
  adding, by the first node device, the AP to the list if the AP is determined to be new; wherein:
    the beacon message includes a value in a first field indicating a cost for the first node device to join the zone of the AP; and
    the zone of the AP includes second node devices, of the plurality of node devices and each of the second node devices has a default route to the AP through one or more hops.

20. The method of claim 19, further comprising:
  if the AP is new, checking, by the first node device, the value in the first field of beacon message; and
  determining, by the first node device, whether to join the zone of the AP based at least in part on a result of said checking.

21. The method of claim 20, wherein the AP has an initial cost value and each of the plurality of node devices has a corresponding cost value, and the value in the first field of the beacon message includes a sum of the initial cost value of the AP and cost values of third node devices of the plurality of node devices located on a route through which the beacon message is sent to the AP by the first node device.

22. The method of claim 21, wherein the initial cost value of the AP is determined based at least in part on traffic load and a number of the second node devices in the zone of the AP.

23. The method of claim 21, wherein the beacon message further includes a value in a second field indicating a number of hops that the beacon message is to be forwarded, the method further comprising:
  sending, by the first node device, a reply message to join the zone of the AP if the value in the first field is smaller by a pre-defined amount than a cost to stay in a zone of another AP that the first node device is currently in;
  updating, by the first node device, the beacon message by adding the first node device's own cost value to the value in the first field; and
  forwarding, by the first node device, the updated beacon message if the value in the second field is greater than zero.

24. The method of claim 23, wherein the beacon message further includes a value in a third field indicating a sequence of the beacon message, the method further comprising:
  if said determining determines that the AP is not new, checking, by the first node device, the value in the third field;
  based on a result of said checking the value in the third field, updating, by the first node device, the list based on routing information of the AP contained in the beacon message;
  forwarding, by the first node device, the updated beacon message if the value in the second field is greater than zero.

25. The method of claim 19, wherein the value in the first field is an indicator of power, stability, or residual bandwidth.

26. A method, comprising:
  sending, by a first node device of a plurality of node devices, a plurality of request messages that request a route to a destination node device;
  receiving, by the first node device, a plurality of reply messages from second node devices of the plurality of node devices and an access point (AP), the reply messages offering a plurality of corresponding routes to the destination node device; and
  selecting, by the first node device, a route from the offered plurality of routes based at least in part on the reply messages;
  wherein:
    each of the reply messages includes a value in a first field indicating a cost to route to the destination node device; and
    the value, in the first field of the reply message from the AP, is a sum of an initial cost value of the AP and cost values of third node devices of the plurality of node devices on a route through which the reply message is received by the first node device from the AP.

27. The method of claim 26, wherein the selected route corresponds to a reply message having a smallest value in the first field.

28. The method of claim 27, wherein if the destination node device is one of the second node devices, the value in the first field is zero.

29. The method of claim 26, wherein the plurality of request messages is to be forwarded for a pre-defined number of hops.

30. An article of manufacture, comprising:
  a tangible computer-readable medium having stored thereon, computer executable instructions that, if executed by a first node device of a plurality of node devices, cause the first node device to perform operations comprising:
    determining, in response to receiving a beacon message from an access point (AP) that solicits joining a zone of the AP, if the AP is new by checking a list of APs of the first node device, wherein the AP is determined to be new if not included in the list; and adding the AP to the list if the AP is determined to be new; wherein:

the beacon message includes a value in a first field indicating a cost for the first node device to join the zone of the AP; and the zone of the AP includes second node devices of the plurality of node devices and each of the second node devices has a default route to the AP through one or more hops.

31. The article of manufacture of claim 30, wherein the operations further comprise:

if the AP is determined to be new, checking the value in the first field of beacon message; and determining whether to join the zone of the AP based at least in part on a result of said checking.

32. The article of manufacture of claim 31, wherein the AP has an initial cost value and each of the plurality of node devices has a corresponding cost value, and the value in the first field of the beacon message includes a sum of the initial cost value of the AP and cost value of third node devices of the plurality of node devices.

33. The article of manufacture of claim 32, wherein the initial cost value of the AP is indicative of at least in part on traffic load and a number of the second node devices in the zone of the AP.

34. The article of manufacture of claim 33, wherein the beacon message further includes a value in a second field indicating a number of hops that the beacon message is to be forwarded; and wherein the operations further comprise:

sending a reply message to join the zone of the AP if the value in the first field is smaller by a pre-defined amount than a cost for staying in a zone of another AP that the first node device is currently in;

updating the beacon message by adding the first node device's own cost value to the value in the first field; and forwarding the updated beacon message if the value in the second field is greater than zero.

35. The article of manufacture of claim 34, wherein the beacon message further includes a value in a third field indicating a sequence of the beacon message;

wherein the operations further comprise:

if said determining determines the AP is not new, checking the value in the third field;

based on a result of said checking, updating the list based on routing information of the AP contained in the beacon message;

forwarding the updated beacon message if the value in the second field is greater than zero.

36. The article of manufacture of claim 30, wherein the value in the first field is an indicator of power, stability, or residual bandwidth.

37. An apparatus, comprising:

a node device that includes:

a receiver configured to receive a beacon message, from an access point (AP), that solicits joining a zone of the AP;

a processor, coupled with the receiver, configured to:

determine if the AP is new by checking a list of APs of the node device, wherein the AP is new if not included in the list; and add the AP to the list if the AP is determined to be new; wherein:

the beacon message includes a value in a first field indicating a cost for the node device to join the zone of the AP; and the zone of the AP includes a first group of node devices and each of the first group of node devices has a default route to the AP through one or more hops.

38. The apparatus of claim 37, wherein the processor is further configured to:

check the value in the first field of beacon message if the AP is new; and determine whether the node device should join the zone of the AP based at least in part on the checked value.

39. The apparatus of claim 38, wherein the value in the first field of the beacon message includes a sum of an initial cost value of the AP and cost values of a second group of node devices located on a route via which the beacon message is received by the node device from the AP.

40. The apparatus of claim 39, wherein the initial cost value of the AP is indicative of at least in part on traffic load and a number of the first group of node devices in the zone of the AP.

41. The apparatus of claim 39, wherein the beacon message further includes a value in a second field indicating a number of hops that the beacon message is to be forwarded;

wherein the node device further comprises a transmitter, coupled with the processor, configured to send a reply message to join the zone of the AP if the value in the first field is smaller by a pre-defined amount than a cost to stay in a zone of another AP that the node device is currently in;

wherein the processor is further configured to update the beacon message to add the node device's own cost value to the value in the first field of the beacon message; and wherein the transmitter is further configured to forward the updated beacon message if the value in the second field is greater than zero.

42. The apparatus of claim 41, wherein the beacon message further includes a value in a third field indicating a sequence of the beacon message, wherein the processor is further configured to:

check the value in the third field;

based on a result of said check of the value in the third field, update the list based on routing information of the AP contained in the beacon message; and forward the updated beacon message if the value in the second field is greater than zero.

43. An apparatus, comprising:

an access point (AP) device that includes:

a transmitter, configured to broadcast a beacon message to be forwarded among a plurality of node devices to solicit joining a zone of the AP device;

a receiver, configured to receive a reply message in response to the beacon message from a first node device of the plurality of node devices; and a processor, coupled with the receiver and transmitter, configured to update a list of node devices in the zone of the AP device based on the reply message;

wherein the zone of the AP device includes second node devices of the plurality of node devices, and each of the second node devices has a default route to the AP device through one or more hops.

44. The apparatus of claim 43, wherein the beacon message includes a value in a first field indicating a cost to join the zone of the AP device, and the value in the first field is configured to be updated each time the beacon message is forwarded.

45. The apparatus of claim 43, wherein the AP device has an initial cost value and each of the plurality of node devices has a corresponding cost value, and the value in the first field of the beacon message includes a sum of the initial cost value of the AP device and cost values of third node devices of the plurality of node devices located on a route that the beacon message is forwarded.

46. The apparatus of claim 43, wherein AP device is configured to determine, from the reply message, about the first node device joining the zone of the AP device, or the AP device is configured to determine, from the reply message, updated routing information of the first node device if the first node device is already in the zone of the AP device.

* * * * *